(12) United States Patent
Hoyt

(10) Patent No.: US 11,666,044 B2
(45) Date of Patent: Jun. 6, 2023

(54) JIG HEAD

(71) Applicant: Rex Harrison Hoyt, Rockport, TX (US)

(72) Inventor: Rex Harrison Hoyt, Rockport, TX (US)

( * ) Notice: Subject to any disclaimer, the term of this patent is extended or adjusted under 35 U.S.C. 154(b) by 695 days.

(21) Appl. No.: 16/278,463

(22) Filed: Feb. 18, 2019

(65) Prior Publication Data

US 2020/0260708 A1 Aug. 20, 2020

(51) Int. Cl.
*A01K 85/01* (2006.01)
*A01K 95/00* (2006.01)
*A01K 83/00* (2006.01)

(52) U.S. Cl.
CPC .............. *A01K 95/00* (2013.01); *A01K 83/00* (2013.01); *A01K 85/01* (2013.01)

(58) Field of Classification Search
CPC ........ A01K 85/00; A01K 85/01; A01K 85/16; A01K 83/06; A01K 83/00; A01K 95/00
USPC ........... 43/44.81, 42.39, 42.24, 42.28, 42.31, 43/42.37, 42.38, 44.2, 44.8
See application file for complete search history.

(56) References Cited

U.S. PATENT DOCUMENTS

| | | | |
|---|---|---|---|
| 1,406,834 A * | 2/1922 | Fisher | A01K 85/00 43/42.14 |
| 1,682,710 A * | 8/1928 | Pflueger | A01K 85/12 43/42.13 |
| 1,820,887 A * | 8/1931 | Pflueger | A01K 85/00 43/42.29 |
| 1,878,015 A | 9/1932 | Steffensen | |
| 2,575,797 A | 11/1951 | Corsi | |
| 2,817,922 A | 12/1957 | Takeshita | |
| 2,909,863 A | 10/1959 | Rector et al. | |
| 3,191,336 A | 6/1965 | Cordell, Jr. | |
| 3,359,674 A | 12/1967 | Strumor | |
| 3,367,060 A | 2/1968 | Abercrombie | |
| 3,483,651 A | 12/1969 | Borger | |
| 3,497,987 A | 3/1970 | Perrin | |
| 3,514,358 A | 5/1970 | Barton | |
| 3,611,614 A | 10/1971 | Ward | |
| 3,802,115 A | 4/1974 | Auten et al. | |
| 3,803,747 A | 4/1974 | Cartwright | |
| 3,848,353 A | 11/1974 | McClellan | |
| 3,854,233 A | 12/1974 | Browning, III | |
| 3,868,784 A | 3/1975 | Sabol | |
| 3,877,168 A | 4/1975 | Stevens | |
| 3,908,298 A | 9/1975 | Strader | |
| 3,909,974 A | 10/1975 | Kent | |
| 3,935,660 A | 2/1976 | Plew | |
| 3,947,989 A | 4/1976 | Bart | |

(Continued)

FOREIGN PATENT DOCUMENTS

| GB | 2340370 | 2/2000 |
|---|---|---|
| JP | 01128739 | 5/1989 |

(Continued)

*Primary Examiner* — Peter M Poon
*Assistant Examiner* — Carly W. Lynch
(74) *Attorney, Agent, or Firm* — Patterson + Sheridan, LLP

(57) ABSTRACT

Lead-head jigs having a polymer keeper configured to retain a soft polymer body to the jig are disclosed therein. In one example, a lead-head jig includes a fish hook passing through a lead casting, and a polymer keeper tightly disposed around the fish hook between a head of the lead casting and a bend of the hook.

20 Claims, 3 Drawing Sheets

(56) References Cited

U.S. PATENT DOCUMENTS

| | | | |
|---|---|---|---|
| 3,959,060 A | 5/1976 | Jones | |
| 3,988,851 A | 11/1976 | Sacharnoski, Sr. | |
| 4,008,539 A | 2/1977 | Gardner | |
| 4,015,363 A | 4/1977 | Sedlak | |
| 4,045,903 A | 9/1977 | Parker | |
| 4,054,004 A | 10/1977 | Schott | |
| 4,123,870 A | 11/1978 | Wiskirchen | |
| 4,219,956 A | 9/1980 | Hedman | |
| 4,334,381 A | 6/1982 | Carver et al. | |
| 4,367,607 A | 1/1983 | Hedman | |
| 4,468,881 A | 9/1984 | Gordon, III | |
| 4,653,212 A | 3/1987 | Pixton | |
| 4,712,326 A | 12/1987 | Hoover et al. | |
| 4,713,907 A | 12/1987 | Dudeck | |
| 4,738,047 A | 4/1988 | Ryan | |
| 4,747,228 A | 5/1988 | Giovengo, Jr. | |
| 4,785,572 A | 11/1988 | Crumley | |
| 4,791,750 A | 12/1988 | Gammill | |
| 4,819,366 A | 4/1989 | Manno | |
| 4,858,367 A | 8/1989 | Rabideau | |
| 4,907,364 A | 3/1990 | Hedman | |
| 4,930,247 A | 6/1990 | Dubois | |
| 4,945,669 A | 8/1990 | Webel | |
| 4,969,287 A | 11/1990 | Johnson | |
| 5,001,856 A | 3/1991 | Gentry | |
| 5,018,297 A | 5/1991 | Kennedy, Jr. | |
| 5,024,019 A | 6/1991 | Rust et al. | |
| 5,025,586 A | 6/1991 | Pixton | |
| 5,038,513 A | 8/1991 | Hardin | |
| 5,070,639 A | 12/1991 | Pippert | |
| 5,081,786 A | 1/1992 | Cobb | |
| 5,092,073 A | 3/1992 | Kaecker | |
| 5,119,581 A | 6/1992 | Rudolph | |
| 5,121,568 A | 6/1992 | Lindmeyer | |
| 5,134,801 A | 8/1992 | Davey | |
| 5,144,765 A | 9/1992 | Keeton | |
| 5,152,094 A | 10/1992 | Strickland | |
| 5,230,178 A | 7/1993 | Dillard | |
| D338,495 S | 8/1993 | Carella | |
| 5,335,443 A | 8/1994 | Grigsby, Jr. | |
| 5,355,613 A | 10/1994 | Kechriotis | |
| 5,381,622 A | 1/1995 | Tregre | |
| 5,396,728 A | 3/1995 | Weber | |
| 5,426,886 A | 6/1995 | Stanley | |
| 5,428,919 A | 7/1995 | Enomoto | |
| D362,486 S | 9/1995 | Short et al. | |
| D363,337 S | 10/1995 | Gentry | |
| 5,456,040 A | 10/1995 | Dickens | |
| 5,461,819 A | 10/1995 | Shindledecker | |
| 5,499,471 A | 3/1996 | Foutch et al. | |
| 5,517,782 A | 5/1996 | Link et al. | |
| 5,524,378 A | 6/1996 | Hood | |
| 5,524,379 A | 6/1996 | Hood | |
| 5,537,775 A | 7/1996 | Crumrine | |
| 5,551,185 A | 9/1996 | Reed | |
| 5,588,247 A | 12/1996 | Wicht | |
| 5,709,047 A | 1/1998 | Link | |
| 5,784,827 A | 7/1998 | Jimenez, Jr. et al. | |
| 5,822,914 A | 10/1998 | Tadych | |
| 5,832,655 A | 11/1998 | Crumrine | |
| 5,870,850 A | 2/1999 | Gramse, Jr. | |
| 5,890,317 A | 4/1999 | Hollomon | |
| 5,899,015 A | 5/1999 | Link | |
| 5,946,847 A | 9/1999 | North | |
| 5,960,580 A | 10/1999 | Link | |
| 6,006,468 A | 12/1999 | Hnizdor | |
| 6,082,038 A | 7/2000 | Link | |
| 6,199,312 B1 | 3/2001 | Link | |
| 6,233,863 B1 | 5/2001 | Dotson | |
| 6,240,672 B1 | 6/2001 | Huppert | |
| 6,266,916 B1 | 7/2001 | Dugan | |
| 6,510,646 B1 | 1/2003 | Kechriotis | |
| 6,601,336 B1 | 8/2003 | Link | |
| 6,651,376 B1 | 11/2003 | Link | |
| 6,772,553 B2 | 8/2004 | Phillips et al. | |
| 6,836,996 B1 | 1/2005 | Huppert | |
| 6,898,894 B1 | 5/2005 | Anderson | |
| 6,978,571 B1 | 12/2005 | Nemire | |
| 7,107,717 B2 | 9/2006 | Rin | |
| 7,140,146 B2 | 11/2006 | Gill | |
| 7,140,147 B2 | 11/2006 | Wacha | |
| 7,216,455 B2 | 5/2007 | Becker | |
| 7,614,178 B2 | 11/2009 | Hoyt | |
| 10,398,135 B1 * | 9/2019 | Morales | A01K 85/005 |
| 10,426,149 B1 * | 10/2019 | Coxey | A01K 85/01 |
| 2004/0107628 A1 | 6/2004 | Mueller | |
| 2007/0044368 A1 | 3/2007 | Duckett | |
| 2007/0107295 A1 | 5/2007 | Kaptis | |
| 2007/0107296 A1 | 5/2007 | Hollomon | |
| 2008/0010893 A1 | 1/2008 | Polachek | |
| 2008/0155883 A1 | 7/2008 | Corbitt | |
| 2008/0236022 A1 | 10/2008 | Harrell | |
| 2009/0084021 A1 | 4/2009 | Bialobrzeski et al. | |
| 2016/0113257 A1 * | 4/2016 | Harrington | A01K 85/01 43/42.31 |

FOREIGN PATENT DOCUMENTS

| | | |
|---|---|---|
| JP | 03004726 | 1/1991 |
| JP | 2005341826 A | 12/2005 |
| JP | 2008092864 A | 4/2008 |
| WO | WO-9419936 | 9/1994 |

\* cited by examiner

US 11,666,044 B2

JIG HEAD

BACKGROUND OF THE DISCLOSURE

Field of the Invention

The embodiments of the invention generally relate to a jig head incorporating a polymer soft body retainer.

Description of the Background Art

Lead-head jigs are a type of fishing lure commonly used for both fresh water and salt water fishing. A lead-head jig generally includes a hook having a molded or cast lead section cast around a hook near the eye of the hook. The jig is typically dressed with a fish attracting member, such as a tube, bucktail, feather or polymer body, or may be used with a strip or natural bait. Commonly, the polymer body is replaceable, allowing the angler to selectively replace the look and color of one fish attracting member with another fish attracting member that has a different look or color so as to find the presentation that most readily provokes a strike from a fish. The replaceable polymer bodies are typically soft and retained to the jig by a keeper. The keeper is usually a wire hook or barb formed integrally with the lead-head of the jig. Undesirably, the soft polymer bodies often become damaged or torn by the keeper after one or more fish strikes, making the body unable to be properly retained to the jig, thus requiring replacement.

Therefore, there is a need for a lead-head jig having an improved keeper for use with plastic bodies.

SUMMARY OF THE INVENTION

Lead-head jigs having a polymer keeper configured to retain a soft polymer body to the jig are disclosed therein. In one example, a lead-head jig includes a fish hook passing through a lead casting, and a polymer keeper tightly disposed around the fish hook between a head of the lead casting and a bend of the hook.

In another example, a lead-head jig includes a fish hook passing through a lead casting, a rattle, and a polymer keeper. The polymer keeper is disposed between a head of the lead casting and a bend of the hook. Nothing other than the rattle is disposed between the fish hook and the keeper.

BRIEF DESCRIPTION OF THE DRAWINGS

So that the manner in which the above recited features of the present invention are attained and can be understood in detail, a more particular description of the invention, briefly summarized above, may be had by reference to the embodiments thereof, which are illustrated in the appended drawings.

To facilitate understanding, identical reference numerals have been used, where possible, to designate identical elements that are common to the figures. It is contemplated that elements and features of one embodiment may be beneficially incorporated in other embodiments without further recitation.

It is to be noted, however, that the appended drawings illustrate only exemplary embodiments of this invention and are therefore not to be considered limiting of its scope, for the invention may admit to other equally effective embodiments.

DETAILED DESCRIPTION

Figure 1:
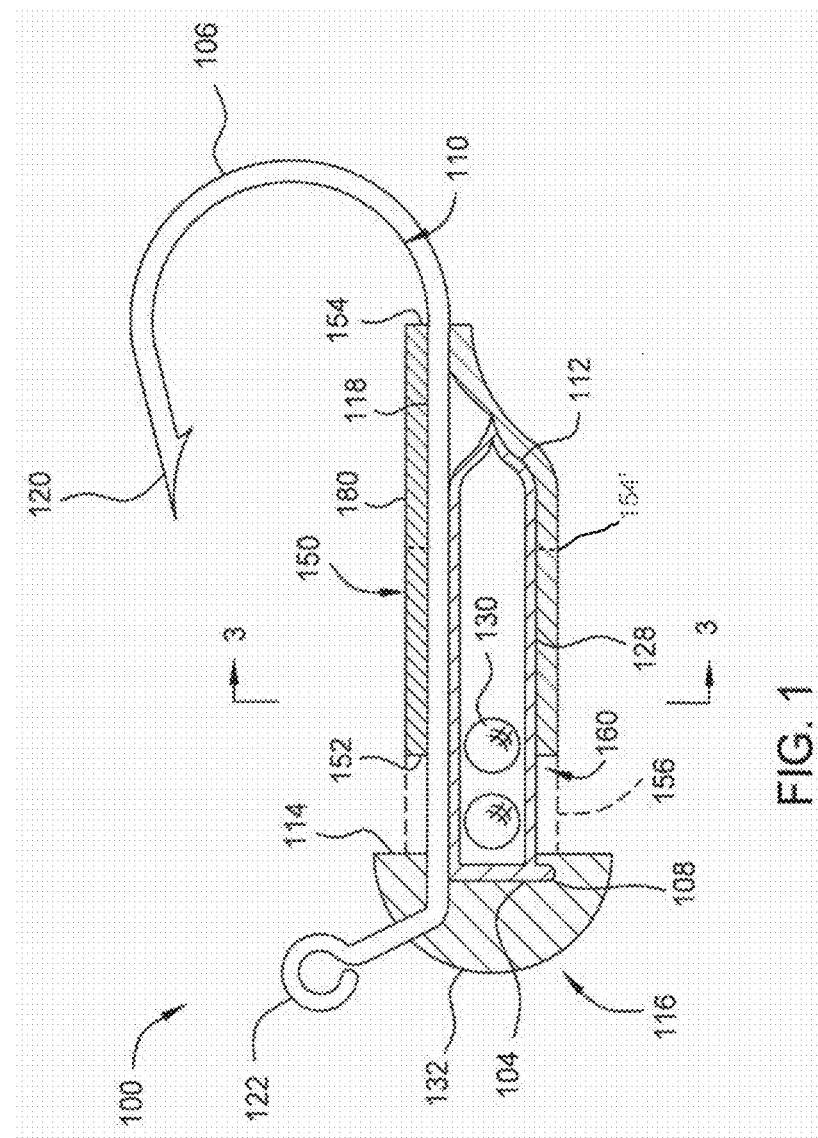
FIG. 1 is a cross-sectional view of one embodiment of a lead-head jig having a rattle.
Figure 2:
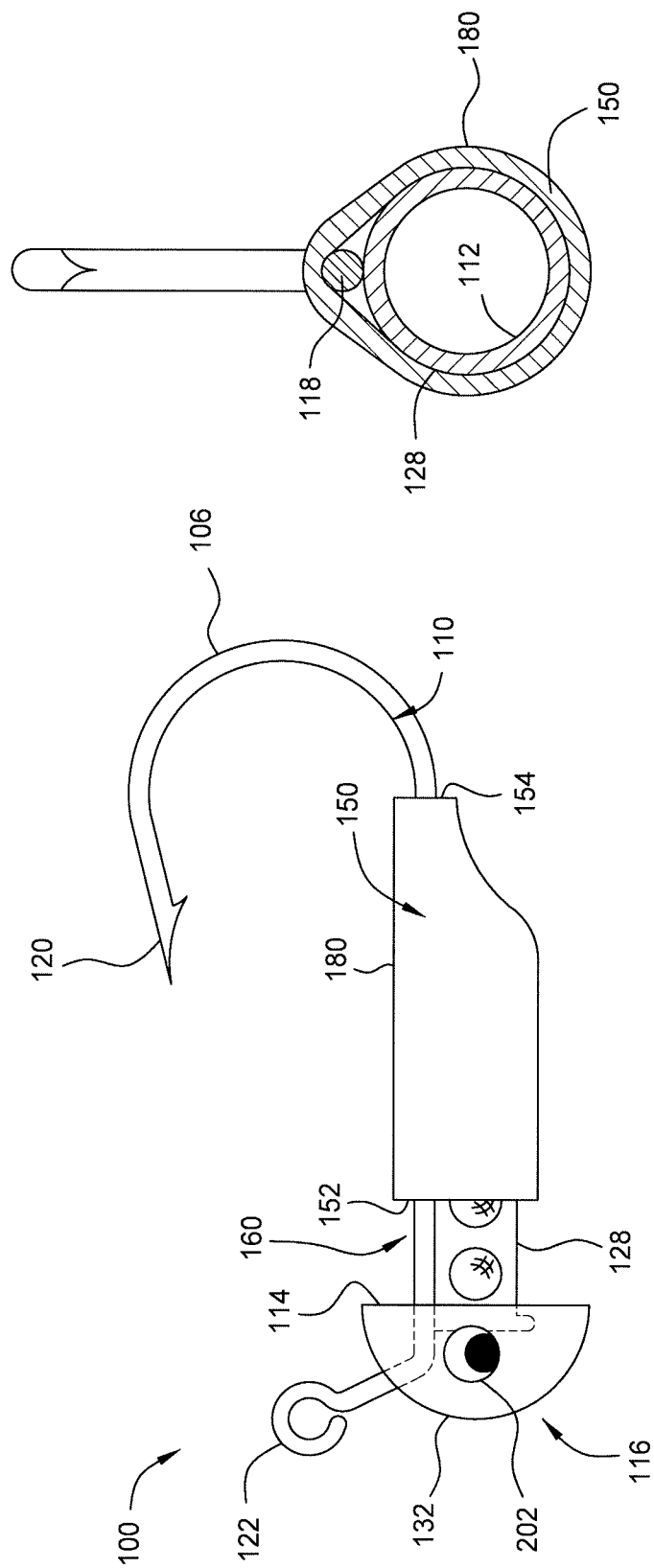
FIG. 2 is a side view of one embodiment of the lead-head jig of FIG. 1.

FIGS. 1 and 2 are sectional and side views of one embodiment of a lead-head jig 100. Lead-head jig 100 generally includes a hook 110 extending through a lead casting 116. Described differently, the lead comprising a jig head 132 of the jig 100 is casted around the hook 110. It is contemplated that plastic may be molded around the hook 110 to form the casting 116. The lead-head jig 100 also includes a polymer keeper 150. The polymer keeper 150 is disposed around the hook 110 and is configured to retain a polymer soft bodied, fish attracting member (as later described with reference to FIG. 4 below).

Continuing to refer to FIGS. 1 and 2, the lead-head jig 100 may optionally include a rattle 112. Inclusion of the rattle 112 greatly enhances the effectiveness of the lead-head jig 100.

In the example depicted in FIGS. 1 and 2, the rattle 112 extends in a cantilevered manner from the jig head 132. The casting 116 substantially encapsulates only an end portion 104 of the rattle 112, thereby holding the rattle 112 in very close proximity and/or in close contact with the hook 110 as further described below. The end portion 104 of the rattle 112 may include a lip 108. The lead casting 116 comprising the head 132 provides weight to the jig 100. The head 132 may be cast into a variety of shapes, such as round, oval, fish-head or other desirable geometric form. In some examples, the head 132 may additionally include an eye 202. In one example, the lead head, a portion of a shaft of the hook, and rattle are painted.

The hook 110 is of a style suitable for jig fabrication, and may be fabricated from stainless or carbon steel. The hook 110 generally includes a barbed end 120, a bend 106, a shank 118 and an eye 122. The eye 122 may be offset, as shown in FIG. 1, to accommodate different styles of the jig head 132. The style of the hook 110 is generally selected such that the shank 118 is at least as long as the rattle 112.

The rattle 112 generally includes an elongated hollow body 128 that houses one or more balls 130. The hollow body 128 may be a cylindrical or other shaped tube having ends sufficiently closed to retain the balls 130 within the hollow body 128. In one embodiment, the ends of the hollow body 128 are water-tight to prevent water from entering the hollow body 128 when the jig 100 is in use.

The hollow body 128 may be fabricated from a metal or crystalline material suitable for producing vibrations when struck by the balls 130. In the embodiment depicted in FIG. 1, the hollow body 128 is fabricated from a brass, glass or quartz material.

Figure 3:
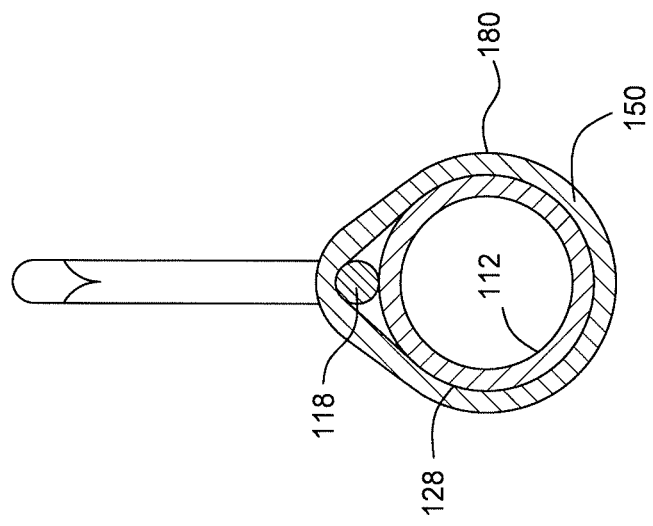
FIG. 3 is a sectional view of the lead-head jig of FIG. 1 taken along section line 3-3.

Referring additionally to FIG. 3, the polymer keeper 150 is generally disposed around the shank 118 of the hook 110. In embodiments where the jig 100 does not incorporate the rattle 112, the polymer keeper 150 and maybe a portion of the casting 116 is disposed only around the shank 118 of the hook 110. In embodiments where the rattle 112 is utilized, the polymer keeper 150 is disposed only around the rattle 112 and the shank 118 of the hook 110 (and maybe a portion of the casting 116). Since the polymer keeper 150 is utilized only to retain a polymer soft bodied, fish attracting member as further discussed below, no other fish attracting member is disposed between the keeper 150 and the fish hook 110. Thus in one more examples, nothing extends out from under the polymer keeper 150 towards the bend 106 of the hook 110 except one or both of the fish hook 110 and the rattle 112.

The polymer keeper 150 is generally be made from a plastic or elastomer. The polymer keeper 150 is made from a short section of tubing that can be secured over the shank 118 of the hook 110. The polymer keeper 150 may be secured over the shank 118 of the hook 110 utilizing adhesives or epoxy, and in one example, the polymer keeper 150 is made from a short section of heat shrink tubing. The heat shrink tubing may optionally include an adhesive that secures the keeper 150 to the shank 118 of the hook 110 (and rattle 112, when present). Suitable materials for the polymer keeper 150 include but are not limited to, a material selected from the group consisting of at least one of an elastomer, a fluorinated ethylene propylene, a polyolefin, a polyvinyl chloride (PVC), a polyvinylidene fluoride (PVCF), and a fluoropolymer.

Returning now to FIGS. 1-2, the polymer keeper 150 generally includes an outer surface 180, a first end 152 and a second end 154. The first end 152 is proximate a back surface 114 of the jig head 132, while the second end 154 is proximate the bend 106 of the hook 110. In one example, the first end 152 extends to and substantially abuts the back surface 114 of the jig head 132, as shown by dashed line 156. In the example depicted in FIGS. 1-2, the first end 152 is spaced from the back surface 114 of the jig head 132 such that a step 160 is formed between the outer surface 180 of the polymer keeper 150 and the rattle 112 and the shank 118 of the hook 110. The step 160 assists in mechanically retaining the soft polymer body when slid over the hook 110 and the keeper 150. Alternatively, nothing extends out from under the polymer keeper 150 towards the bend 106 of the hook 110 except the fish hook 110 and the rattle 112 as shown by the end 154' (shown by dashed line) of the keeper 150.

Figure 4:
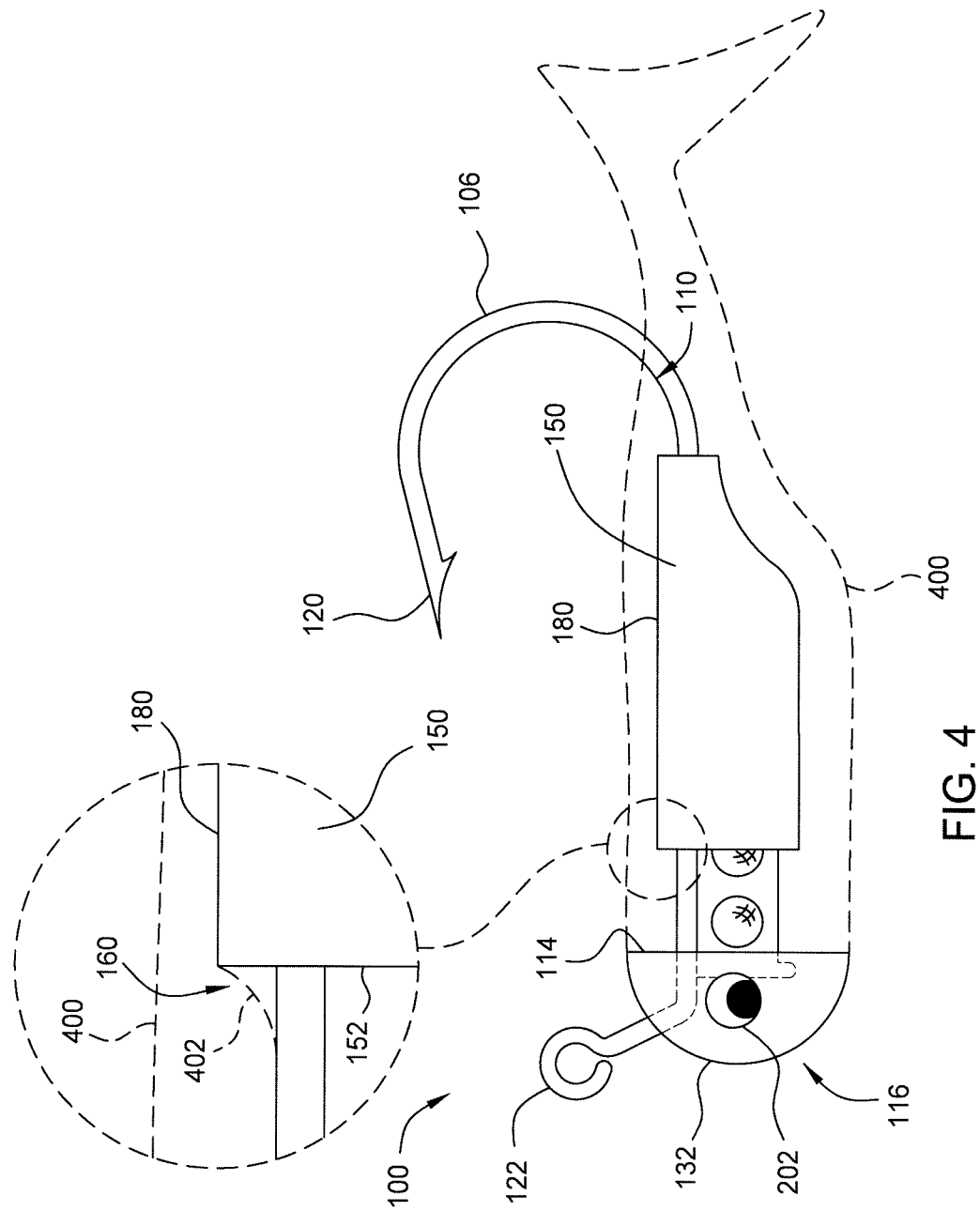
FIG. 4 is a side view of the lead-head jig of FIG. 1 having a plastic body (shown in phantom) disposed thereon.

FIG. 4 is a side view of the lead-head jig 100 of FIG. 1 having a replaceable polymer soft bodied, fish attracting member (e.g., polymer body 400) disposed thereon. The polymer body 400 may have any suitable shape, such as worms, shrimp, crabs, crawdads, jerk baits, tubes, frogs, minnows, paddle tails, and shads, among many others.

The polymer body 400 is generally attached to the jig 100 by inserting the barbed end 120 of the hook 110 into the front of the body 400 and passing the barbed end 120 of the hook 110 through the bottom of the body 400, thus threading the body 400 onto the shaft 119 of the hook 110 and over the polymer keeper 150. As such, the polymer keeper 150 retains the polymer body 400 to the shank 118 of the hook 110 by engaging the inside 402 of the polymer body 400 as the hook 110 (and keeper 150) is passed through the body 400. Since the second end 154 of the polymer keeper 150 is tapered (e.g., has a diameter less than the first end 152 of the keeper 150), the polymer body 400 is easily guided over up and over the rattle 112 with little effort and with less potential damage to the body 400.

The polymer body 400 is typically made of polyvinyl chloride (PVC) that is combined with an oil-based resin, although other materials may be utilized. Since the outer surface 180 of the polymer keeper 150 has a coefficient of friction that is much higher than the coefficient of friction of the rattle 112 and shank 118, the friction between the inside 402 of the polymer body 400 and the polymer keeper 150 substantially resists movement of the polymer body 400 once installed over the keeper 150. Moreover, free bonds at the surface of the inside 402 of the polymer body 400 and the outer surface 180 of the polymer keeper 150 generally interact, thus further holding the polymer body 400 to the polymer keeper 150. In some examples, the material of the keeper 150 is different than a material of the body 400, and may be selected to further enhance the bonding, friction or otherwise prevent relative motion therebetween once the body 400 is disposed over the keeper 150.

The polymer body 400 is also mechanically coupled to the jig 100. For example, the polymer body 400, being resiliently compliant, wants to conform to the diameter of the rattle 112 and shank 118. As such, the step 160 formed by the first end 152 of the keeper 150 functions to inhibit the inside 402 of the polymer body 400 from moving towards the bend 106 of the hook 110 once the body 400 has been threaded beyond the first end 152 of the polymer keeper 150.

Thus, the polymer keeper 150 allows polymer bodies to be secured to the jig 100 without the use of barbs or wire hooks. Conventional barbs or wire hooks often tear the polymer body during fish strikes, rendering the body unsuitable for further use. Moreover, should a fish strike cause the polymer body to slide over the polymer keeper 150, the keeper 150 will not damage the soft polymer body as would a conventional barb or retaining wire, thus allowing the polymer body to be reused many times after multiple fish strikes when a conventional jig would have destroyed and rendered the polymer body unusable. Accordingly, the keeper 150 allows the polymer body to be utilized longer without need of replacement, which cannot be accomplished with conventional, fixed barb jig designs.

While the foregoing is directed to embodiments of the present invention, other and further embodiments of the invention may be devised without departing from the basic scope thereof, and the scope thereof is determined by the claims that follow.

The invention claimed is:

1. A lead head jig comprising:
a lead casting;
a rattle having one end secured in a head of the lead casting;
a fish hook passing through the lead casting; and
a polymer keeper tightly disposed around the rattle and the fish hook between the head of the lead casting and a bend of the hook.

2. The jig of claim 1, wherein the polymer keeper is disposed only around a shank of the fish hook and the rattle.

3. The jig of claim 1, wherein the polymer keeper further comprises:
heat shrink tubing.

4. The jig of claim 3, wherein nothing extends out from under the heat shrink tubing towards the bend of the hook except the fish hook and the rattle.

5. The jig of claim 3, wherein the keeper is spaced from the lead casting, and wherein nothing extends out from under the heat shrink tubing towards the bend of the hook except the fish hook and the rattle.

6. The jig of claim 1, wherein the keeper is fabricated from a material selected from the group consisting of at least one of an elastomer, a fluorinated ethylene propylene, a polyolefin, a polyvinyl chloride (PVC), a polyvinylidene fluoride (PVCF), and a fluoropolymer.

7. The jig of claim 1, wherein no other fish attracting member is disposed between the keeper and the fish hook.

8. The jig of claim 7 further comprising:
a replaceable polymer body disposed over and completely covering the keeper.

9. The jig of claim 8, wherein the replaceable polymer body is bonded to the keeper.

10. A lead head jig comprising:
a lead casting;
a rattle secured in the lead casting;
a fish hook passing through the lead casting; and
a polymer keeper tightly disposed around the rattle and the fish hook, the polymer keeper disposed between a head of the lead casting and a bend of the hook, wherein nothing other than rattle is disposed between the fish hook and the keeper, wherein the polymer keeper is the sole keeper for securing a replaceable polymer body to the jig.

11. The jig of claim 10, wherein the polymer keeper is spaced from the lead casting.

12. The jig of claim 10, wherein the rattle further comprises:
an elongated glass body.

13. The jig of claim 10, wherein the polymer keeper further comprises:
heat shrink tubing.

14. The jig of claim 13, wherein nothing extends out from under the heat shrink tubing towards the bend of the hook except one or both of the fish hook and the rattle.

15. The jig of claim 14, wherein the keeper is spaced from the lead casting.

16. The jig of claim 14, wherein the keeper is fabricated from a material selected from the group consisting of at least one of an elastomer, a fluorinated ethylene propylene, a polyolefin, a polyvinyl chloride (PVC), a polyvinylidene fluoride (PVCF), and a fluoropolymer.

17. The jig of claim 16 further comprising:
a replaceable polymer body disposed over and completely covering the keeper.

18. The jig of claim 17, wherein the replaceable polymer body is bonded to the keeper.

19. The jig of claim 14, wherein the head of the lead casting, a portion of a shaft of the hook, and rattle are painted.

20. The jig of claim 14, wherein the keeper is tighter around the fish hook at an end of the keeper closest to the bend of the fish hook than a portion of the keeper proximate the lead casting.

* * * * *